United States Patent
Dang et al.

(10) Patent No.: US 12,536,298 B2
(45) Date of Patent: Jan. 27, 2026

(54) SOFTWARE CODE VULNERABILITY REMEDIATION

(71) Applicant: Capital One Services, LLC, McLean, VA (US)

(72) Inventors: Steven Dang, Plano, TX (US); Chih-Hsiang Chow, Plano, TX (US); Elizabeth Furlan, Plano, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 266 days.

(21) Appl. No.: 18/314,910

(22) Filed: May 10, 2023

(65) Prior Publication Data
US 2023/0274006 A1 Aug. 31, 2023

Related U.S. Application Data

(63) Continuation of application No. 17/064,186, filed on Oct. 6, 2020, now Pat. No. 11,687,658.

(51) Int. Cl.
*G06F 21/57* (2013.01)
*G06F 8/36* (2018.01)

(52) U.S. Cl.
CPC .............. *G06F 21/577* (2013.01); *G06F 8/36* (2013.01)

(58) Field of Classification Search
CPC .......... G06F 21/577; G06F 8/36; G06F 8/658; G06F 2221/033; G06F 21/568; G06F 21/563
See application file for complete search history.

(56) References Cited

U.S. PATENT DOCUMENTS

| | | | |
|---|---|---|---|
| 8,407,800 B2 | 3/2013 | Schloegel et al. | |
| 8,935,794 B2 | 1/2015 | Brake et al. | |
| 9,069,967 B2 | 6/2015 | Wysopal et al. | |
| 9,298,924 B2 | 3/2016 | Abadi et al. | |
| 9,639,703 B2 | 5/2017 | Liu | |
| 9,648,029 B2 | 5/2017 | Cheng | |
| 10,069,855 B1 | 9/2018 | Long et al. | |
| 2006/0101047 A1 | 5/2006 | Rice | |
| 2012/0042383 A1 | 2/2012 | Greene et al. | |
| 2013/0007701 A1* | 1/2013 | Sundararam | G06F 8/30 717/109 |
| 2017/0187743 A1 | 6/2017 | Madou et al. | |
| 2019/0205125 A1 | 7/2019 | van Schaik | |
| 2020/0349259 A1* | 11/2020 | Tsai | G06F 21/562 |
| 2021/0056211 A1 | 2/2021 | Olson et al. | |
| 2022/0067174 A1 | 3/2022 | Gupta | |
| 2022/0253533 A1* | 8/2022 | Choi | G06F 8/427 |

\* cited by examiner

*Primary Examiner* — Huan V Doan
(74) *Attorney, Agent, or Firm* — TROUTMAN PEPPER LOCKE LLP; Christopher J. Forstner; John A. Morrissett

(57) ABSTRACT

Systems and methods automating the process of application code vulnerability remediation. Implementations include building a repository of code revisions as software is checked for security vulnerabilities using or more software analysis tools. In certain implementations, historical code revisions are cataloged and stored in the repository. The revisions may be tokenized and utilized to detect and automatically remediate similar issues when new software packages are submitted to the system.

20 Claims, 9 Drawing Sheets

AUTOMATED VULNERABILITY REMEDIATION

SOFTWARE CODE VULNERABILITY REMEDIATION

CROSS REFERENCE TO RELATED APPLICATIONS

This application is a continuation of, and claims priority under 35 U.S.C. § 120 to, U.S. patent application Ser. No. 17/064,186 filed 6 Oct. 2020, and published as U.S. Patent Publication No. US20220108020 on 7 Apr. 2022, the entire contents of which are fully incorporated herein by reference.

FIELD

The disclosed technology relates generally to software security, and more particularly, to systems and methods that automate software vulnerability remediation using generalized tokens that are generated based on historical code revisions.

BACKGROUND

Software development is an iterative process that involves writing, testing, and revising code. Common software errors cause a computer program to produce incorrect, unexpected, or unintended results. Such errors can include functionality errors, communication errors, missing commands, syntax errors, error handling issues, calculation errors, control flow errors, etc. Defect identification, categorization, reporting, and removal of such errors are part of the software quality control process.

Software components such as object structures, channels, services, endpoints, handlers, library calls, etc. are often integrated into the code to enable a variety of functions without requiring the programmer to hand-code every process. Coding and component integration errors can result in vulnerabilities within a computer system that can be difficult and time consuming detect and correct. Some vulnerabilities can arise from combinations of library calls, object-oriented constructs or other external interactions. The vulnerabilities can lead to capability failures, unauthorized access (hacking), memory violations, input validation errors, viruses and other concerns.

Prior to submitting code for production, a software developer can utilize various analysis tools to identify known bugs and vulnerabilities in the code, for example, by performing raw lookups on common patterns that are subject to attacks by bad actors. Static code analysis engines (such as Checkmarx and LucentSky) can perform analysis on the text and/or binary code and the known vulnerabilities can be identified and labeled. Manual revisions are performed to rectify the identified vulnerabilities, and the code checking/revision process can be repeated. Such manual remediation process can be effective in correcting code vulnerabilities; however, this process takes a significant amount of time, and does not scale to provide reliable automated vulnerability remediation. A need exists for a software code vulnerability remediation solution to address such concerns.

BRIEF SUMMARY

Aspects of the disclosed technology include systems and methods for tokenizing software code security vulnerabilities and performing automated remediation of matching vulnerabilities in application code.

In one example implementation, a system is provided that can include one or more processors and memory in communication with the one or more processors. The memory stores instructions that, when executed by the one or more processors, causes the system to receive initial vulnerability listings responsive to submissions of one or more initial code packages to one or more software security analysis tools; receive subsequent vulnerability listings responsive to actual or potential remediations of the one or more initial code packages by the one or more software security analysis tools; generate differential listings comprising vulnerability remediation updates to the one or more initial code packages by the one or more software security analysis tools; generate one or more generalized remediation tokens for each of the vulnerability remediation updates identified in the differential listings; receive an application code package; locate one or more fields of the application code package that include a vulnerability defined by one or more of the generalized remediation tokens; and automatedly remediate, using the one or more fields, the vulnerability in the application code package. The one or more fields as defined herein may include statements, values, application programming interface (API) calls, multiple fields, etc.

A method is provided for automated remediation of application code using tokenized software code security vulnerabilities. The method includes receiving an application code package; identifying one or more fields of the application code package that correspond to a generalized remediation token; outputting for review by a user, one or more options for remediation of the of the one or more fields of the application code package; and responsive to a selection of the one or more options, automatically applying remediation of the one or more fields of the application code package using the generalized remediation token according to a selected option.

A non-transitory computer readable storage medium is disclosed that stores instructions that are configured to cause one or more processors to: receive initial vulnerability listings responsive to submissions of one or more initial code packages to one or more software security analysis tools; receive subsequent vulnerability listings responsive to actual or potential remediations of the one or more initial code packages by the one or more software security analysis tools; generate differential listings comprising vulnerability remediation updates to the one or more initial code packages by the one or more software security analysis tools; generate a generalized remediation token for each of the vulnerability remediation updates identified in the differential listings; receive an application code package; locate one or more fields of the application code package that include a security vulnerability defined by one or more of the generalized remediation tokens; output for review by a user, a menu of one or more options for remediation of the of the one or more fields of the application code package; and remediate the one or more fields of the application code package automatically according to a selected option using remediation updates associated with the one or more generalized remediation tokens.

Further features of the present disclosure, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, explain the principles of the disclosed technology. In the drawings.

DETAILED DESCRIPTION

Figure 1:
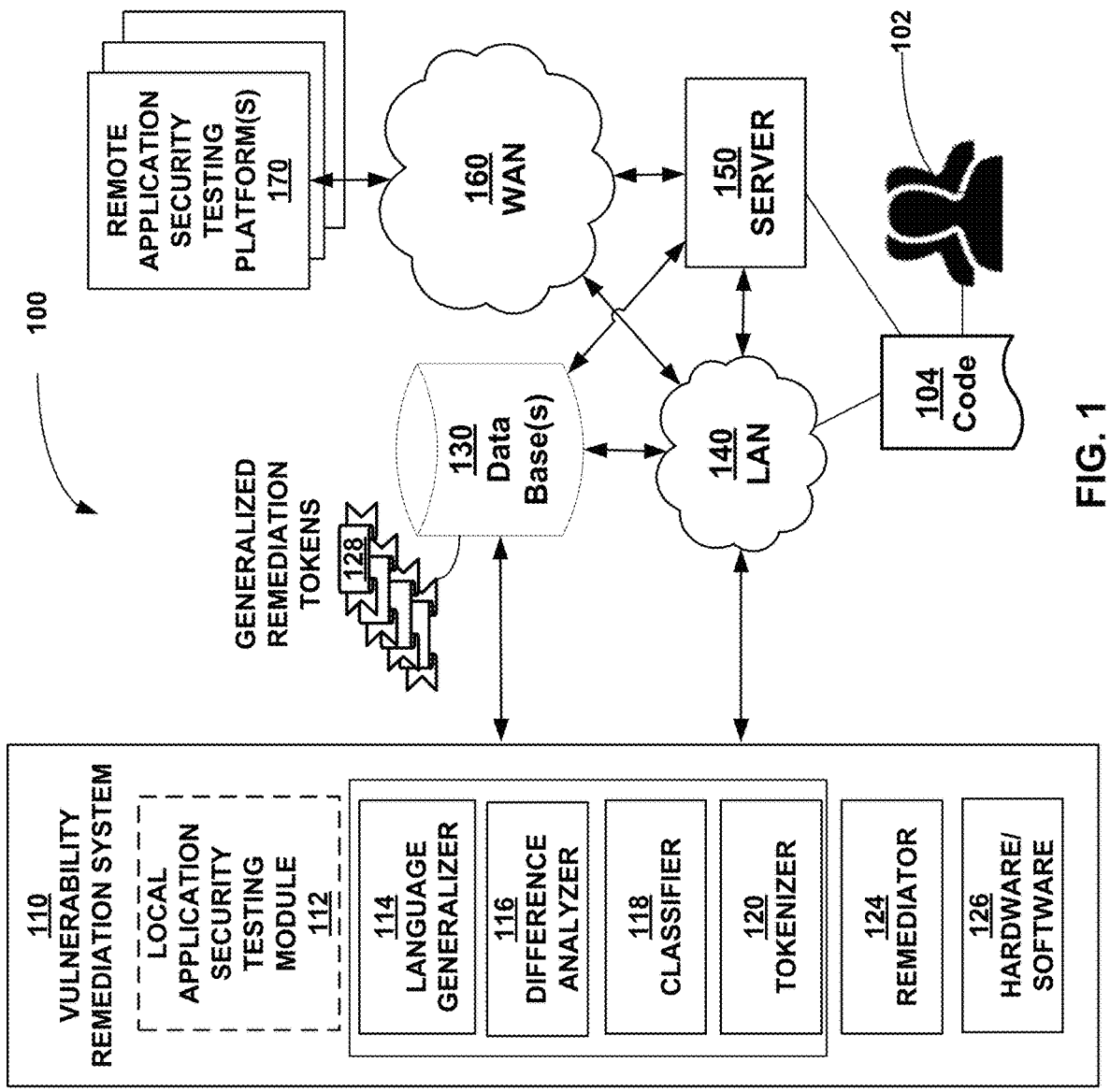
FIG. 1 is a block diagram of an example environment and system that may be used to implement software vulnerability remediation, according to certain example implementations of the disclosed technology.

Systems and methods are disclosed herein for automating the process of application code vulnerability remediation. Certain implementations include building a repository of code revisions as software is checked for security vulnerabilities using or more software analysis tools. In certain implementations, historical code revisions are cataloged and stored in the repository. The revisions may be tokenized and utilized to detect and automatically remediate similar issues when new software packages are submitted to the system.

Consistent with the disclosed embodiments, generalized remediation tokens may be generated based on differential listings of actual and/or potential vulnerabilities identified by the one or more software analysis tools plus any remediation updates and/or code changes that are made to correct the identified vulnerabilities. In certain implementations, the generalized remediation tokens may be used to locate and/or automatedly remediate the same (or similar) types of vulnerabilities in one or more fields (or lines of code) in a newly submitted application code package. In certain implementations, the process may utilize historical remediation data from previously tested software packages to automatically find code security vulnerabilities in current submissions of software packages.

In accordance with certain exemplary implementations of the disclosed technology, suggested code remediations may be automatically identified upon processing an application code package with the generalized remediation tokens. In certain exemplary implementations, the suggested code remediations may be presented to a user for approval to remediate one or more fields of the application code package.

Certain exemplary implementations of the disclosed technology may pool and/or weight similar generalized remediation tokens according to their respective actions, such as changed or unchanged code, severity of vulnerability threat, and/or vulnerability type. In accordance with certain exemplary implementations of the disclosed technology, the pooled generalized remediation tokens may be selectively applied to check an application code package for corresponding classes of vulnerabilities. Embodiments of the disclosed technology may improve the speed and/or efficiency of the remediation process.

Traditional and/or current solutions to remediate software vulnerabilities typically involve manual corrections by a software engineer when a vulnerability is found. The code is typically revised and resubmitted for further analysis via a code check-in process (such as via Github). The code goes through another scan using a static analysis engine, and the process repeats, often many times.

In contrast, the solutions disclosed herein utilize incremental changes to the code base and compares the changes with the vulnerabilities findings that are exposed from the static analysis engines after each iteration. By cataloging the differences associated with each static analysis commit (removals, additions, changed code lines), such information can be used to build tokens by language and vulnerability type, which may then be applied to quickly solve similar issues in newly submitted code.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed systems and methods. Such other components not described herein may include, but are not limited to, for example, components developed after development of the disclosed technology. It is also to be understood that the mention of one or more method steps does not preclude the presence of additional method steps or intervening method steps between those steps expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a block diagram of an example environment and system 100 that may be used to implement software vulnerability remediation, according to certain example implementations of the disclosed technology. The environment and system 100 may enable software developers 102 to submit application code 104 to one or more remote application security testing platforms 170 via one or more of a local area network 140, a server 150, and a wide area network 160 (such as the Internet). In certain exemplary implementations, the test results (such as suggested code revisions, line numbers, vulnerability types, etc.) produced by the remote application security testing platforms 170 may be received and stored in the one or more databases 130. In certain exemplary implementations, the test results may be utilized by the vulnerability remediation system 110 to generate generalized remediation tokens 128, as will be further explained below.

In certain exemplary implementations, the remote application security testing platform(s) 170 may perform functions such as Static Application Security Testing (SAST), Open Source Analysis (OSA), Dynamic Application Security Testing (DAST), Interactive Application Security Testing (IAST), etc. Each of these software security analysis tools may be provided by a different licensor or vendor, and thus each may be independent of each other. The SAST tools, for example, may include Checkmarx™ and Fortify™, among other possibilities. The OSA tools, for example may include WhiteSource™ and Blackduck™, among other possibilities. The DAST tools, for example, may include WebInspect™ and Contrast™, among other possibilities. The IAST tools, for example, include Veracode™ and WhiteHat™, among other possibilities.

In accordance with certain exemplary implementations, the vulnerability remediation system 110 can include one or more components, modules, and/or hardware 112-126 configured to perform certain specialized functions associated with the analysis and automatic remediation of the code 104 responsive the code 104 being submitted to the vulnerability remediation system 110. The vulnerability remediation system 110 may be in communication with the one or more databases 130, which in addition to storing test results received from the remote application security testing platforms 170, may be configured as a repository to store generalized remediation tokens 128 generated by the tokenizer module 120 of the vulnerability remediation system 110.

In certain exemplary implementations, the vulnerability remediation system 110 can include an (optional) local application security testing module 112 that may perform some or all of functions that can be performed by one or more of the remote application security testing platforms 170.

The generalized remediated tokens 128 may be generated by one or more of the modules of the vulnerability remediation system 110 based on test results generated by the remote application security testing platforms 170 and/or the local application security testing module 112 upon submission of code 104. According to an exemplary implementation of the disclosed technology, a language generalizer 114 may receive the test results (suggested code revisions, line numbers, vulnerability types, etc.) and generalize each flagged code change to encapsulate the initial problematic line(s) of code and the suggested or actual associated revision. In certain exemplary implementations, the type of vulnerability associated with the problematic code may also be captured and utilized.

In accordance with certain exemplary implementations of the disclosed technology, the difference analyzer 116 may be utilized to receive and further process the encapsulated information generated by the language generalizer 114, for example, to generate (and store as or in a token 128) generalized differences made between the initial problematic line(s) of code and the suggested or actual associated revisions so that subsequently encountered similar issues in code submissions may be automatically remediated in the same (or similar) way.

As indicated above, the test results provided by the remote application security testing platforms 170 or local application security testing module 112 may provide information as to the type of vulnerability associated with the problematic code. When available, the classifier 118 may receive and further encapsulate this information as a classification of the detected vulnerability, and such information may be stored with the token 128 and referenced to the corresponding changed line or lines of code.

The tokenizer 120, according to certain example implementations, may encapsulate the information generated by one or more of the language generalizer 114, the difference analyzer, and/or the classifier 118 to generate the generalized remediation tokens 128.

In accordance with certain exemplary implementations of the disclosed technology, the remediator 124 may scan code 104 that is submitted to the vulnerability remediation system 110 and find lines of code that match one or more of the generalized remediation tokens 128. The remediator may utilize the historical information gathered from analysis of previous code (as represented in the generalized remediation tokens 128) to make similar remediations as done in previously tested code. In certain exemplary implementations, the remediations may be done automatically. In some implementations, the remediations may be done selectively. In some implementations the remediations may be done for a particular selected class of vulnerability. In accordance with certain exemplary implementations of the disclosed technology, remediations may include changes to syntax, library calls, object-oriented constructs, external interaction function calls, etc. As shown in FIG. 1, certain hardware and software 126 of the vulnerability remediation system 110 may be utilized to carry out some or all of the functions and processed discussed above, as will be discussed below with reference to FIG. 2.

For application code 104 of each software project, vulnerability remediation system 110 may calculate classifications and/or scores for each category of tools that perform a scan of the code 104. For example, a static vulnerability score may be generated based on findings generated by one or more SAST tools; an open source vulnerability score based on findings generated by one or more OSA tools; a dynamic vulnerability score based on findings generated by one or more DAST tools; and/or an interactive vulnerability score based on findings generated by one or more IAST. If only one tool of a given category is used to perform a scan of the code 104, the score for that specific category may be based on findings of that tool alone. If multiple tools of a given category are used to perform a scan of the code 104, then the category score for that specific category may be based on findings of all tools of that specific category.

Each category score may be a numeric score. Each category score may be normalized to a 100-point scale, among other possibilities. Each category score may take into account multiple scans performed by tools of the same category. Each category score may take into account multiple scans performed during the same scan session or at different scan sessions.

To help software owners or developers 1020 gain a better understanding of a security vulnerability state of software projects over time, the vulnerability remediation system 110 may adjust scores over time to account for vulnerabilities per scan and remediation, which may take into account the age of specific findings and frequency of finding. In certain exemplary implementations, an overall s score may be recomputed and adjusted accordingly as scores are adjusted. The overall score may not only indicate vulnerabilities based on findings, but also reflect use of the tools used by the testing platforms 170 or module 112.

Based on the overall score, the owner or developer 102 may determine any necessary action to address remaining vulnerabilities. For example, if the score is below a release threshold, the developer may decide not to release the software project. For instance, the overall score may be 75, and the release threshold may be 80. Since the overall score is below the release threshold, the developer may consider that it is too risky to release the software project, and additional scans and remediation may be initiated.

Figure 2:
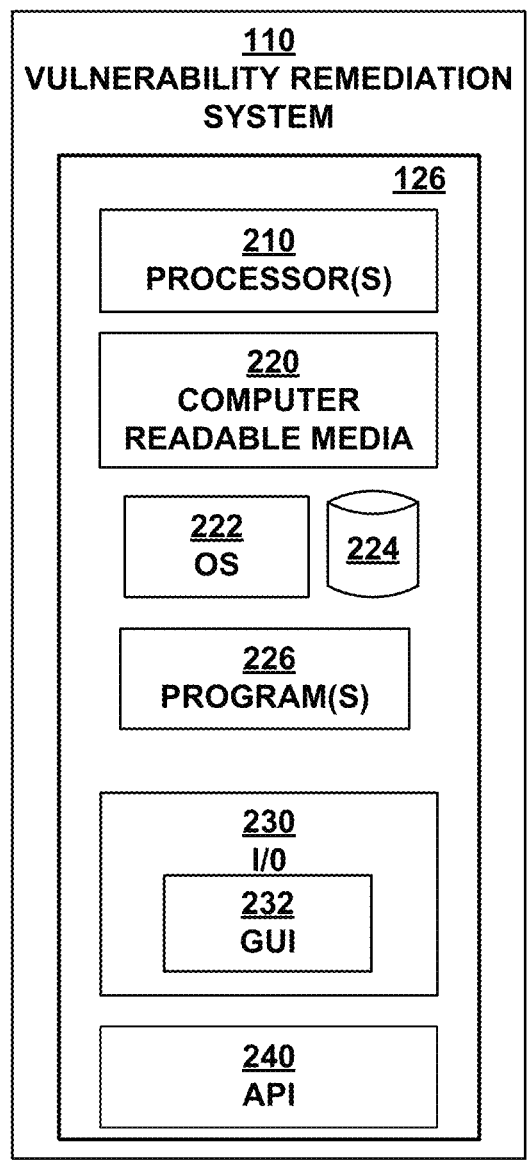
FIG. 2 is a block diagram of an example vulnerability remediation system, according to an aspect of the disclosed technology.

FIG. 2 is a block diagram of the example vulnerability remediation system 110 with further details of the hardware and software 126 components (as also illustrated and discussed above with respect to FIG. 1, according to an aspect of the disclosed technology.

The vulnerability remediation system 110 may include one or more of the following: one or more processors 210, a non-transitory computer readable medium 220, an operating system 222, memory 224, one or more programs 226 including instructions that cause the one or more processors 210 to perform certain function associated with the vulnerability remediation process; an input/output ("I/O") device 230, and an application program interface (API) 240, among other possibilities. The I/O device 230 may include a graphical user interface 232.

Figure 3:
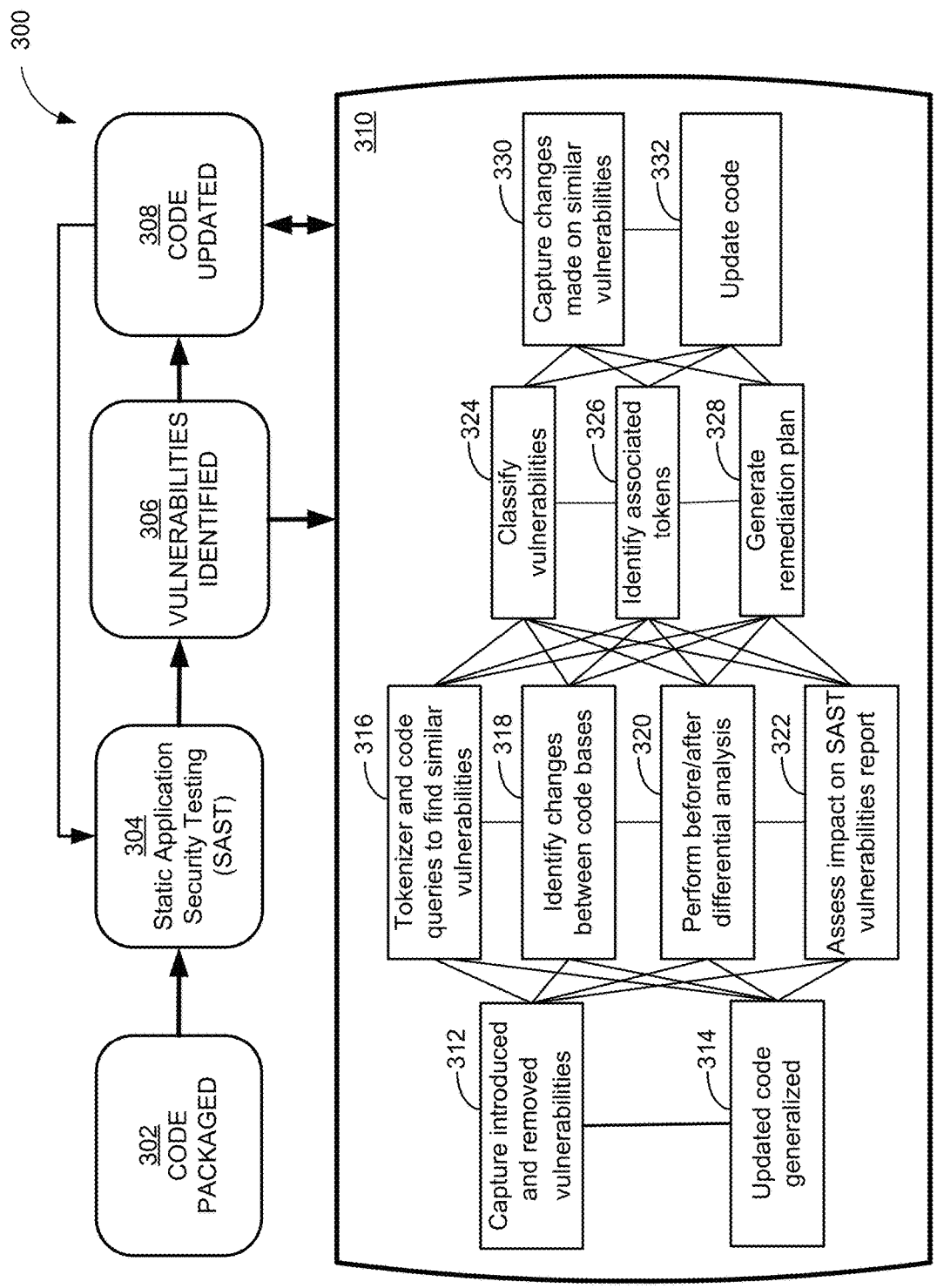
FIG. 3 is a block diagram illustrating an automated vulnerability remediation process, according to certain example implementations of the disclosed technology.

FIG. 3 is a block diagram illustrating an automated vulnerability remediation process, according to certain example implementations of the disclosed technology. The process can begin after source code has been prepared and packaged 302 for submission for testing. In this example, the code is packaged 302 and submitted for testing by one or more Static Application Security Testing (SAST) tools 304, which may be designed to analyze source code (and/or compiled versions of code) to help find security flaws and identify vulnerabilities 306 so that the code may be updated 308. In certain implementations, after the code is updated 308, it may be re-submitted to the SAST tool 304 for subsequent testing and the code differences between updates may be captured and tokenized. The tokens may then be utilized to find and remediate similar issues in subsequent code packages. In this example implementation, the SAST tool may output a listings of actual and/or potential vulnerabilities identified for the automated vulnerability remediation process(s) 310, as will be explained in detail below.

In other implementations (not shown), the SAST tool may be integrated into the development environments (IDEs) and may provide a primary user interface that gives the developer immediate feedback as vulnerability issues are introduced into the code during code development itself. In such implementations, the identified vulnerabilities (along with corrections) may be captured and tokenized (as discussed above) and the tokens may then be utilized to find and remediate similar issues in subsequent code packages.

In certain exemplary implementations, the automated vulnerability remediation process 310 may include a plurality of sub-processes 312-332 that may work in sequence, parallel, or a combination, as appropriate. In accordance with certain example implementations, the listings of actual and/or potential vulnerabilities identified and removed by the SAST tool may be captured 312. Responsive to an introduced and removed vulnerability, the corresponding updated code (associated with the removed vulnerability) may generalized 314, for example, based on the difference between the code line(s) before and after the vulnerability removal. The generalized code for each type of removed vulnerability may be tokenized and used to locate and correct similar coded defects. In certain implementations, such tokens may be applied to the current revision version of the code (i.e., used immediately for subsequent lines in the code under test). In other implementations, the generated tokens may be used in subsequent code submissions or revisions.

In accordance with certain exemplary implementations of the disclosed technology, a tokenizer may utilize the generated tokens and code queries to find similar vulnerabilities 316 that match the tokens. In certain exemplary implementations, changes may be identified between codes bases 318. In certain exemplary implementations, a before/after differential analysis 320 may be performed and stored with the associated token as a way of providing instruction as to what code changes are to be made when the code queries locate code that is a match for the token. According to certain aspects, vulnerability impact assessment 322 may be determined, for example, based on the identified vulnerability and/or remediation plan.

In accordance with certain exemplary implementations of the disclosed technology, the detected vulnerabilities may be classified 324, for example, by the related risk, including but not limited to injection, broken authentication, sensitive data exposure, XML external entities, broken access control, security misconfiguration, cross-site scripting, insecure deserialization, use of components with known vulnerabilities, insufficient logging, insufficient monitoring, cross-site request forgery, unvalidated redirects and forwards, etc.

The automated vulnerability remediation process 310 may include identifying associated tokens 326 according to code that matches the generalized token format. Certain implementations may capture changes made on similar vulnerabilities 330, for example, based on the SAST testing 304. In response, new tokens may be generated and/or previous tokens may be revised to include the similar vulnerabilities. As discussed above, the code 332 may be updated. In some implementations, generated remediation plan 328 may be utilized to update the code automatically. In other example implementations, the remediation plan 328 may be presented for selective updating of the code 332, for example, based on the class(es) of vulnerabilities.

Figure 4:
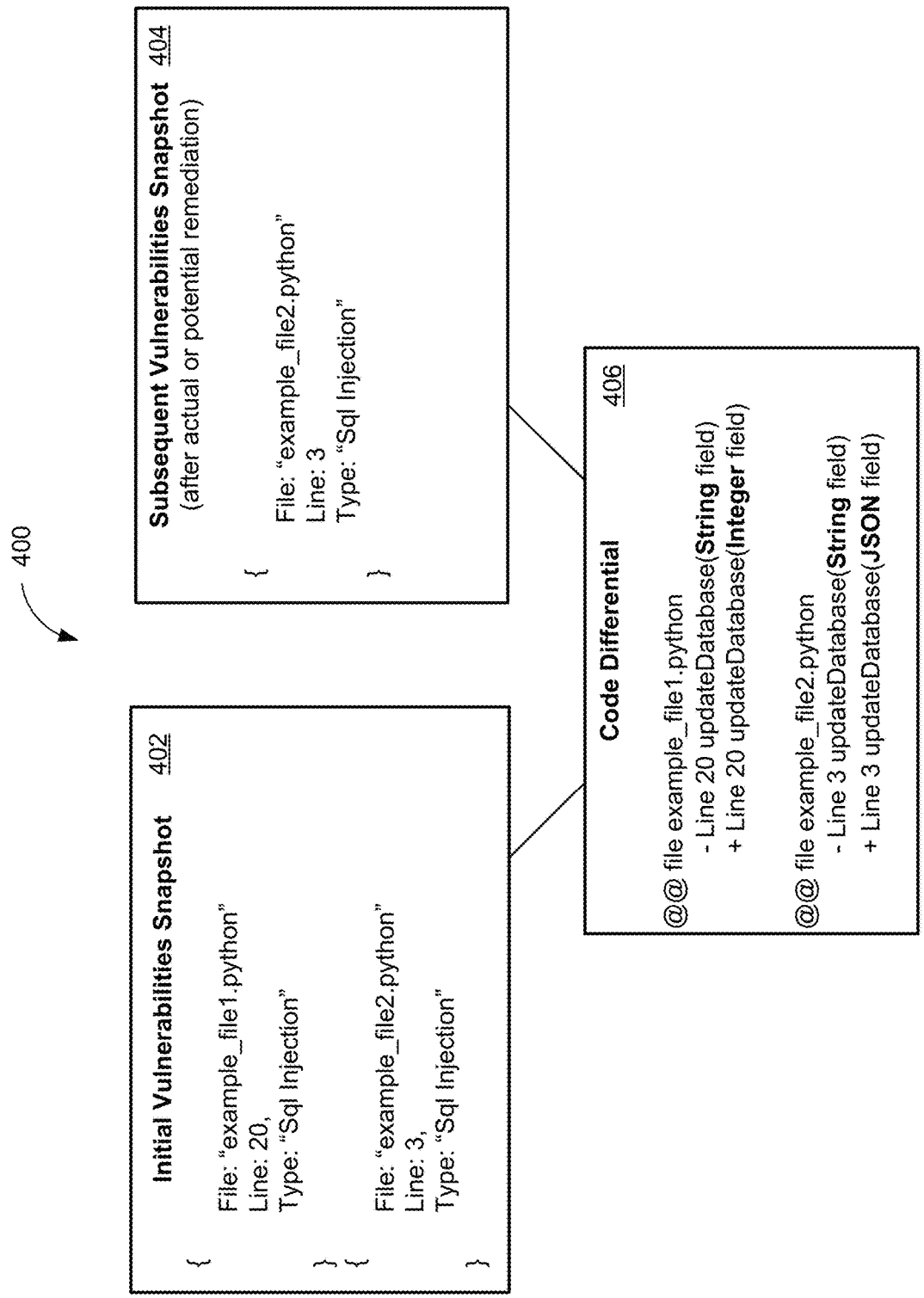
FIG. 4 illustrates a code differential listing based on initial and subsequent code vulnerability snapshots, according to an aspect of the disclosed technology.

FIG. 4 illustrates a code differential listing based on initial and subsequent code vulnerability snapshots, according to an aspect of the disclosed technology. In accordance with certain exemplary implementations of the disclosed technology, the initial vulnerabilities snapshot 402 may be a listing of vulnerabilities that are identified in the initial SAST run and testing report before any vulnerabilities are removed. The subsequent vulnerabilities snapshot 404 may be a listing of vulnerabilities identified in a subsequent nth run after the initial run of the SAST testing after some potential remediation. The code differential 406 may be a listing of the actual lines of code identified by a comparison of the initial 402 and subsequent 404 snapshots.

Figure 5:
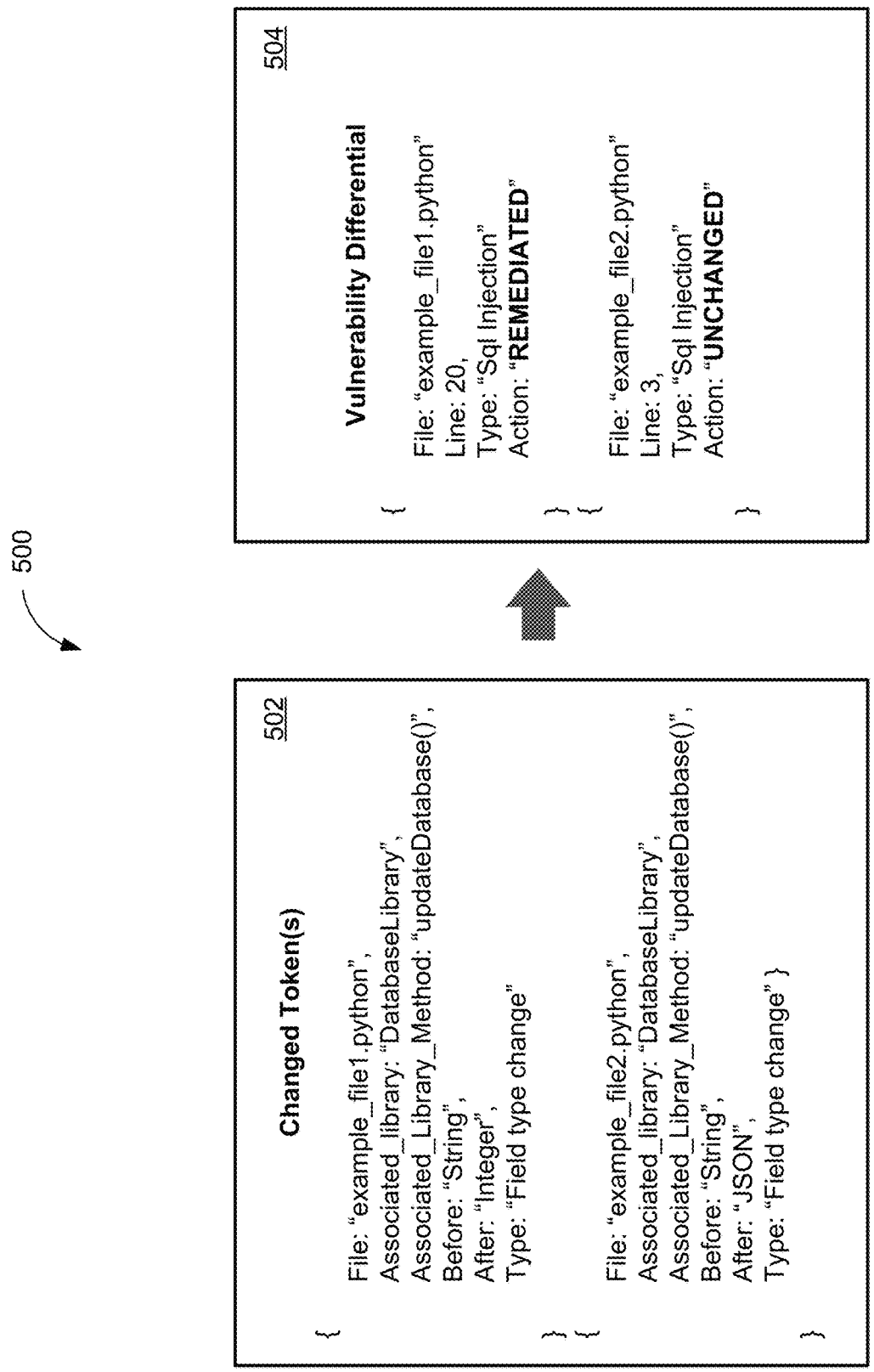
FIG. 5 illustrates a listing of remediated vulnerabilities, according to an example implementation of the disclosed technology.

FIG. 5 illustrates a listing of remediated vulnerabilities, according to an example implementation of the disclosed technology. In certain exemplary implementations, the changed token(s) 502 listing and the vulnerability differential listing 504 may be output. The specific changed token may be denoted within each set of parentheses in the Type field. In the specific examples here, the token change included a Field Type Change. The token(s) change(s) can include adding filtering (through regex, etc. . . . ), field type changes (e.g. using an Integer type vs a String type), using an updated library version (moving from versions 1.1->1.3 which has been known to remediate said vulnerabilities), etc. . . . .

Figure 6:
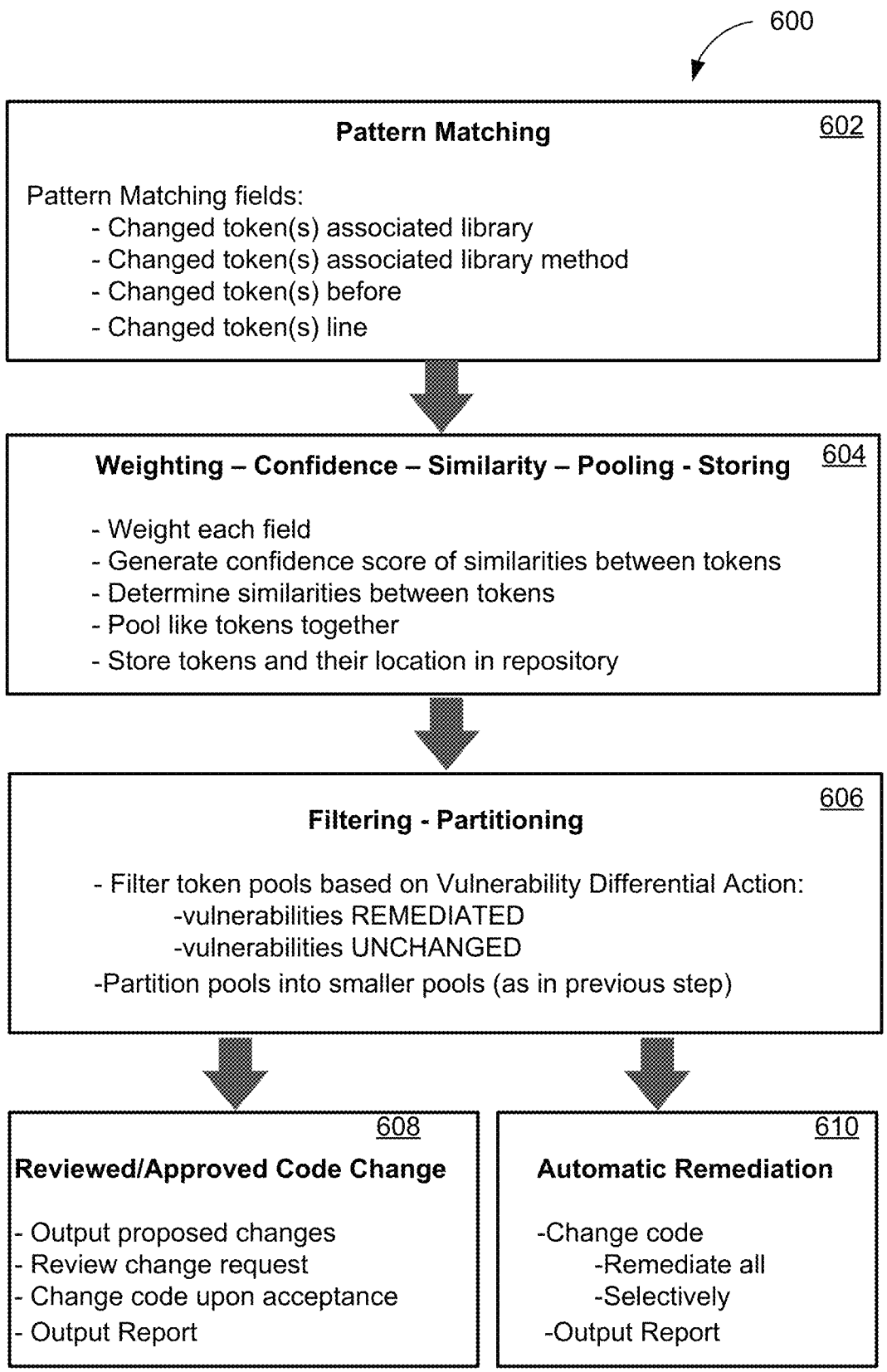
FIG. 6 illustrates a process for changing code, according to an example implementation of the disclosed technology.

FIG. 6 illustrates a process 600 for changing code to remediate determined vulnerabilities, according to an example implementation of the disclosed technology. Some aspects of the process 600 may be implemented after a predetermined threshold number of generalized remediation tokens have been generated, for example, based on historical code revisions as discussed above. Certain aspects of the process 600 may be used to further evaluate, refine, score, categorize, pool, and/or filter tokens.

In block 602, the process 600 can include pattern matching, for example, to find similar remediation change patterns among generated tokens. In accordance with certain exemplary implementations of the disclosed technology, the generated tokens store remediation code change information (see changed token(s) 502 of FIG. 5 for example) that can be used to further evaluate, refine, score, categorize, pool, and/or filter tokens. The example pattern matching fields, such as the associated library, method, field before remediation change, and line number are fields that may have particular value that can enable an efficient search of similar tokens within a same repository and/or among different repositories.

In block 604, the process 600 can include one or more of the steps of (a) weighting each field; (b) generating a confidence score of similarities between tokens; (c) determining similarities between tokens; (d) pooling like tokens together; and/or storing tokens and their location in a repository. In certain exemplary implementations, weights may be given to each of the changed parameters (as discussed above with reference to block 602) to generate a confidence score of similarities between tokens. In certain exemplary implementations, similar tokens may be pooled together and stored along with their locations in the repository.

In accordance with certain exemplary implementations of the disclosed technology, tokens (and/or part or all of the information stored in the token) may be pooled into group of tokenized code whose tokens have already been analyzed. As an example of this pooling, consider a first pool denoted "Pool A" with the following example entries indicating a vulnerability such as Cross-Site-Scripting:

VulnerableLibraryA(String A);
VulnerableLibraryA(String B);

An example "Pool B" may include the following entries indicating a vulnerability such as Security Misconfiguration:

VulnerableLibraryB(Integer C);
VulnerableLibraryB(Integer D);

As indicated in the examples above, same type or class of vulnerabilities may be grouped into each respective pool via the tokenized code contained in each pool.

In block 606, the process 600 can include filtering and/or partitioning. For example, token pools may be filtered based on the historical action(s) taken upon detecting (potential or actual) vulnerabilities in previous code scans and remediations. In certain exemplary implementations, vulnerabilities that are remediated may be partitioned separately from vulnerabilities that are unchanged, resulting in partition pools that may be smaller than the pools discussed above with respect to block 604.

In accordance with certain exemplary implementations of the disclosed technology, the remaining steps (blocks 608 and/or 610) in the process 600 may be carried out in different ways or combinations depending on certain process configurations. In a first example implementation, and as indicated in block 608, code changes may be reviewed and approved prior to changes. For example, a request for proposed changes may be output and a change request may be reviewed. Upon acceptance, the code may be changed according to the proposed and approved changes. I In other example implementations, as shown in block 610, the code may be automatically remediated, either in whole (i.e., all vulnerabilities corresponding to those tokens in the remediated portioned token pool as discussed above) or selectively by class or type. According to certain exemplary implementations, once the code has been remediated (via either or both of the processes shown in blocks 608 and 610), a report may be output summarizing the changes. In accordance with certain exemplary implementations, the report may be used for additional feedback input for the process of generating or refining the generalized remediation tokens.

Figure 7:
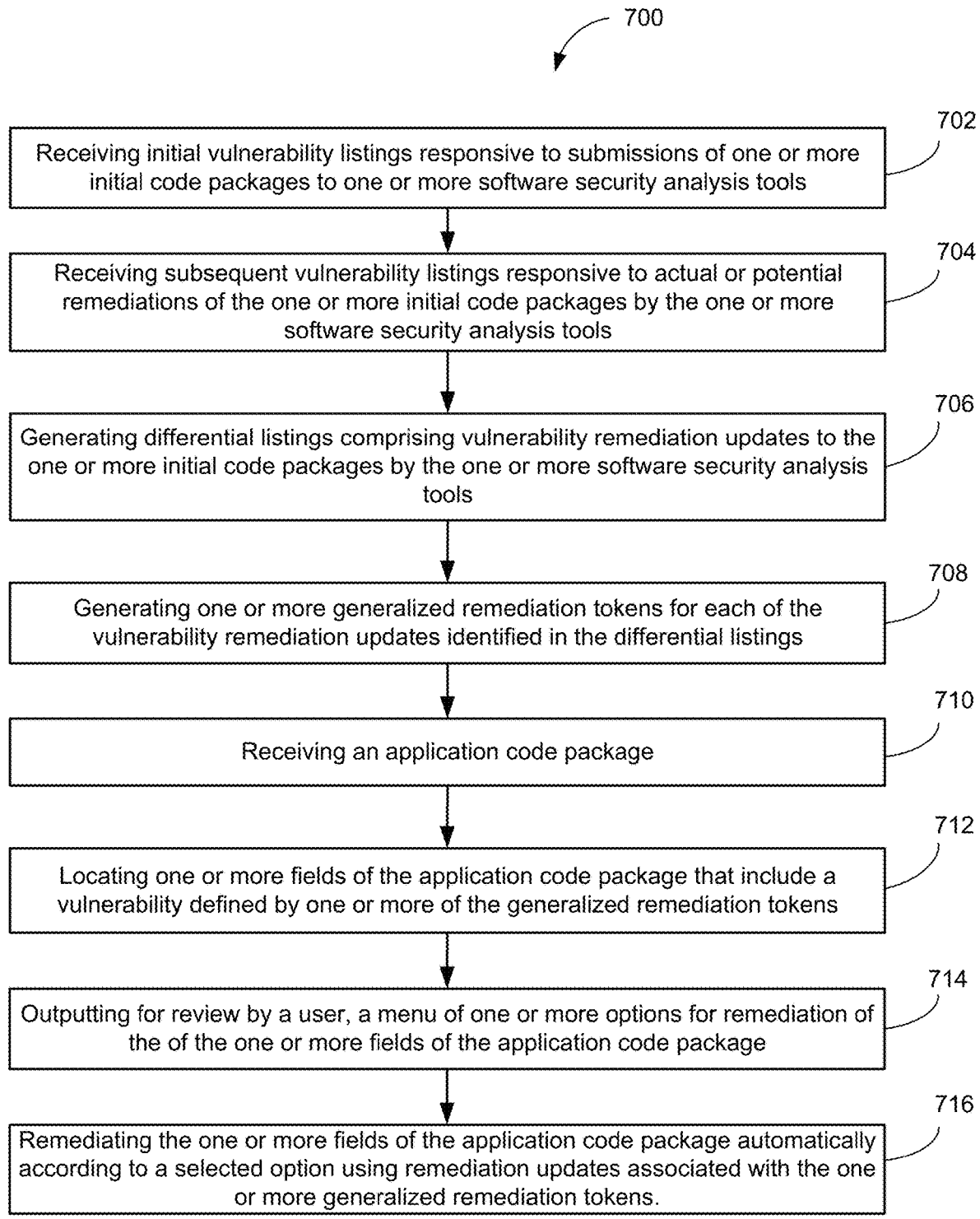
FIG. 7 is a flow diagram of a method for tokenizing software code security vulnerabilities and remediating matching vulnerabilities in application code, according to an example implementation of the disclosed technology.

FIG. 7 is a flow diagram of a method 700 for automated remediation of application code using tokenized software code security vulnerabilities, according to an example implementation of the disclosed technology. In block 702, the method 700 includes receiving initial vulnerability listings responsive to submissions of one or more initial code packages to one or more software security analysis tools. In block 704, the method 700 includes receiving subsequent vulnerability listings responsive to actual or potential remediations of the one or more initial code packages by the one or more software security analysis tools. In block 706, the method 700 includes generating differential listings comprising vulnerability remediation updates to the one or more initial code packages by the one or more software security analysis tools. In block 708, the method 700 includes generating a generalized remediation token for each of the vulnerability remediation updates identified in the differential listings. In block 710, the method 700 includes receiving an application code package. In block 712, the method 700 includes locating one or more fields of the application code package that include a vulnerability defined by one or more of the generalized remediation tokens. In block 714, the method 700 includes outputting for review by a user, a menu of one or more options for remediation of the of the one or more fields of the application code package. In block 716, the method 700 includes remediating the one or more fields of the application code package automatically according to a selected option using remediation updates associated with the one or more generalized remediation tokens.

According to an exemplary implementation of the disclosed technology, each of the remediation updates may identify one or more of: an associated library, a library method, a line, an initial value, and a subsequent changed value.

In certain exemplary implementations, at least one of the fields of the application code package may be replaced with the subsequent changed value of the remediation update associated with a corresponding generalized remediation token.

Figure 8:
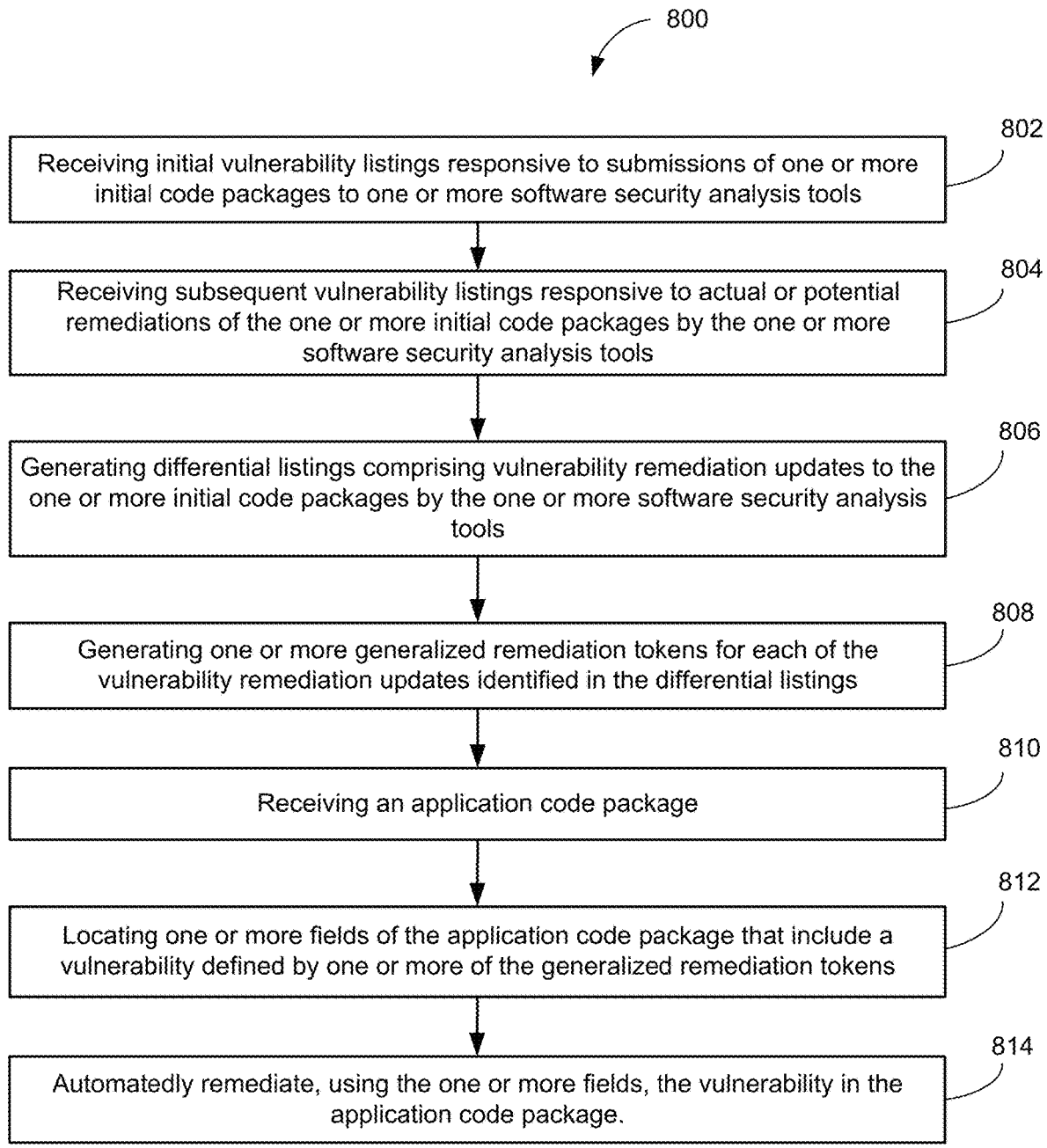
FIG. 8 is a flow diagram of a method for automated remediation of application code using tokenized software code security vulnerabilities, according to an example implementation of the disclosed technology.

FIG. 8 is a flow diagram of a method 800 for automated remediation of application code using tokenized software code security vulnerabilities, according to an example implementation of the disclosed technology. In block 802, the method 800 includes receiving initial vulnerability listings responsive to submissions of one or more initial code packages to one or more software security analysis tools. In block 804, the method 800 includes receiving subsequent vulnerability listings responsive to actual or potential remediations of the one or more initial code packages by the one or more software security analysis tools. In block 806, the method 800 includes generating differential listings comprising vulnerability remediation updates to the one or more initial code packages by the one or more software security analysis tools. In block 808, the method 800 includes generating a generalized remediation token for each of the vulnerability remediation updates identified in the differential listings. In block 810, the method 800 includes receiving an application code package. In block 812, the method 800 includes locating one or more fields of the application code package that include a vulnerability defined by one or more of the generalized remediation tokens. In block 814, the method 800 includes automatedly remediate, using the one or more fields, the vulnerability in the application code package.

Certain example implementations may further output for review by a user, a menu of one or more options for remediation of the of the one or more fields of the application code package and remediate the one or more fields of the application code package automatically according to a selected option.

In accordance with certain exemplary implementations of the disclosed technology, each of the vulnerability remediation updates may identify one or more of: an associated library, a library method, a line, an initial value, and a subsequent changed value.

In certain exemplary implementations, at least one of the fields of the application code package are remediated by replacement using the subsequent changed value of at least one of the vulnerability remediation updates associated with a corresponding generalized remediation token.

Some implementations may apply a weight to each field of the differential listings according to one or more of: a type of a vulnerability threat; and a severity of the vulnerability threat.

In certain exemplary implementations, similarities may be determined among the generalized remediation tokens and similar generalized remediation tokens may be pooled together. According to an exemplary implementation of the disclosed technology, the pooled similar generalized remediation tokens may be stored in a repository.

In certain exemplary implementations, the generalized remediation tokens are pooled according to remediated and unchanged action associated with the vulnerability remediation updates.

In accordance with certain exemplary implementations of the disclosed technology, the one or more software security analysis tools belong to at least one of: Static Application Security Testing (SAST), Open Source Analysis (OSA), Dynamic Application Security Testing (DAST); and Interactive Application Security Testing (IAST).

Certain implementations may further determine and output an overall risk score for the application code by computing a weighted average of each field of the application code associated with the one or more generalized remediation tokens according to one or more of a vulnerability threat type and a vulnerability threat severity.

Figure 9:
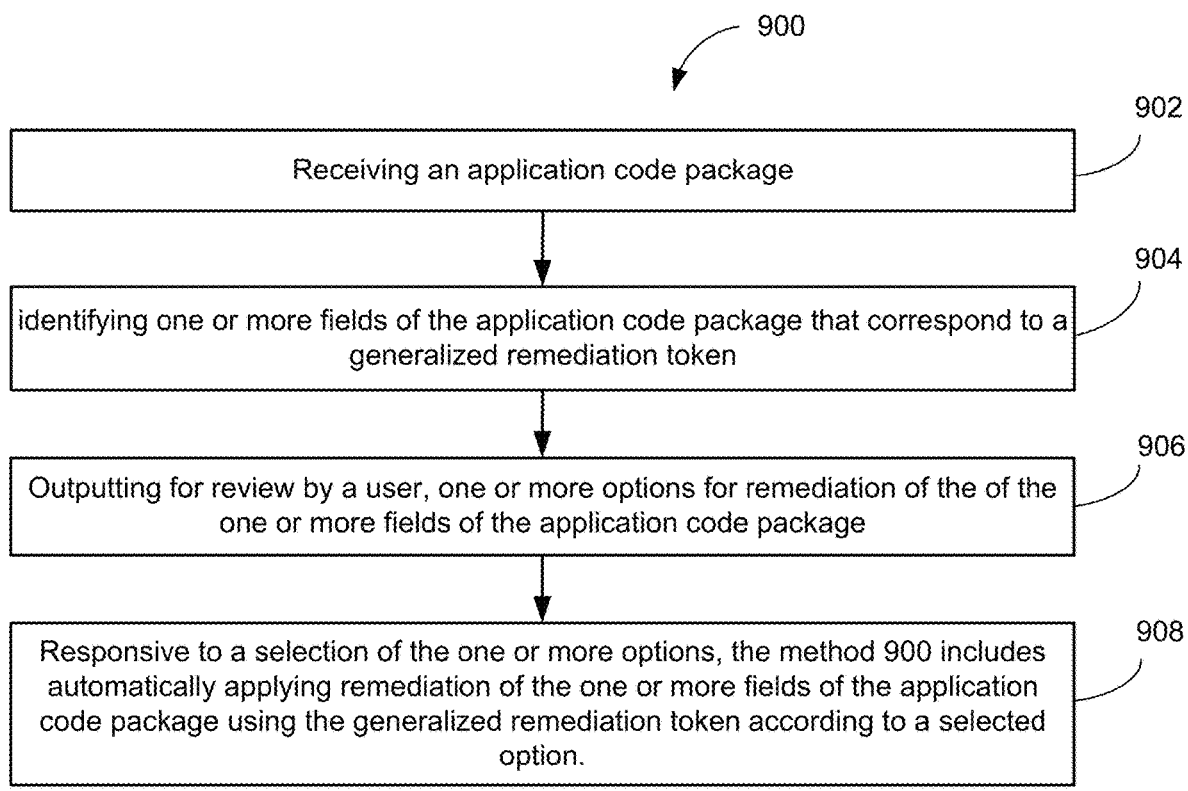
FIG. 9 is a flow diagram of a method for automated remediation of application code using tokenized software code security vulnerabilities, according to an example implementation of the disclosed technology.

FIG. 9 is a flow diagram of a method 900 for automated remediation of application code using tokenized software code security vulnerabilities, according to an example implementation of the disclosed technology. In block 902, the method 900 includes receiving an application code package. In block 904, the method 900 includes identifying one or more fields of the application code package that correspond to a generalized remediation token. In block 906, the method 900 includes outputting for review by a user, one or more options for remediation of the of the one or more fields of the application code package. In block 908, and responsive to a selection of the one or more options, the method 900 includes automatically applying remediation of the one or more fields of the application code package using the generalized remediation token according to a selected option.

Returning to FIG. 1 and FIG. 2, the vulnerability remediation system 110 may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

The processor(s) 210 may include one or more of a microprocessor, microcontroller, digital signal processor, co-processor or the like or combinations thereof capable of executing stored instructions and operating upon stored data. The processor(s) 210 may be one or more known processing devices, such as a microprocessor from the Pentium™ family manufactured by Intel™ or the Turion™ family manufactured by AMD™. The processor(s) 210 may constitute a single core or multiple core processor that executes parallel processes simultaneously. For example, the processor(s) 210 may be a single core processor that is configured with virtual processing technologies. In certain embodiments, the processor(s) 210 may use logical processors to simultaneously execute and control multiple processes. The processor(s) 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The non-transitory computer readable medium 220 may store an operating system ("OS") 222 and one or more programs 226. The non-transitory computer readable medium 220 may include one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the non-transitory computer readable medium 220. The non-transitory computer readable medium 220 may include one or more memory devices that store data and instructions used to perform one or more features of the disclosed embodiments. The non-transitory computer readable medium 220 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The non-transitory computer readable medium 220 may include software components that, when executed by the processor(s) 210, perform one or more processes consistent with the disclosed embodiments. In some embodiments, the non-transitory computer readable medium 220 may include a memory 224 that may be used to perform one or more of the processes and functionalities associated with the disclosed embodiments. The non-transitory computer readable medium 220 may include one or more programs 226 to perform one or more functions of the disclosed embodiments. Moreover, the processor 210 may execute one or more programs 226 located remotely from the vulnerability remediation system 110. For example, the vulnerability remediation system 110 may access one or more remote programs 226, that, when executed, perform functions related to disclosed embodiments.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented or may not necessarily need to be performed at all, according to some implementations of the disclosed technology.

These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

This written description uses examples to disclose certain implementations of the disclosed technology, including the best mode, and to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXEMPLARY USE CASES

The following example use cases describes a certain practical application and implementation of the disclosed technology. As discussed above with reference to FIG. 1, a developer 102 may submit application code 104 to one or more remote application security testing platforms 170 via one or more of a local area network 140, a server 150, and a wide area network 160 (such as the Internet). The test results with code differential (such as suggested code revisions, line numbers, vulnerability types, etc.) produced by the remote application security testing platforms 170 may be received and stored in the one or more databases 130. The test results are utilized by the vulnerability remediation system 110 to generate a list of changed tokens which are compared against the corresponding vulnerability differentials, i.e., the removal and/or addition of vulnerabilities due to the changes in the code.

The code and vulnerability differential listings provides data that is used to generate generalized remediation tokens that are used to located and remediate subsequent vulnerabilities. In the exemplary use case, similar tokens are pooled by vulnerability type and whether or not the associated line of code in the tested application package was changed (to remediate the vulnerability) or not. The changed tokens may be used to fine similar tokens in other pools of tokens, for example, by pattern matching other locations within the same code repository or separate code repository that contain tokens that are similar to the code before changed token, and similar changes are made to the similar tokens.

In this example use case, a line of code may incorrectly reference a string parameter when it should be referencing an integer parameter, and the remote application security testing platform may make the correction. By comparing vulnerability snapshots based on before and after changes are made by the remote application security testing platforms, the vulnerability may be tokenized, and the token may be used to remove similar vulnerabilities in subsequent code. In this example, the changed token may be represented by the following remediated vulnerability listing:

```
{ File: "example_file1.python",
  Associated_library: "DatabaseLibrary",
  Associated_Library_Method: "updateDatabase( )",
  Before: "String",
  After: "Integer",
  Type: "Field type change" }
```

The changed token, as indicated above, may be placed in the token pool, labeled TOKEN 1, and partitioned as a token that remediated a vulnerability. A similar token labeled TOKEN 2 may be found in Repository A (e.g. DatabaseLibrary library used, updateDatabase method used, and field type is currently String). Further, TOKEN 3 may be a token that is similar to TOKEN 2 but is found in Repository B (e.g. DatabaseLibrary library used, updateDatabase method used, and field type is currently String). The "Field type change" as applied in TOKEN 1 may be applied from a String to an Integer in TOKEN 2 and TOKEN 3 to remediate these similar vulnerabilities. In one exemplary implementation of the disclosed technology, once the changes have been applied to a local copy of the code repository, the plan for remediation may be submitted to the developer for review and approval.

In another use case, the developer may opt to allow the vulnerability remediation system to automatically remediate all or certain types or classes of detected vulnerabilities based on the remediation tokens and processing of submitted code. In yet another use case, the developer may selectively approve classes and or types of vulnerabilities for automatic remediation in accordance with certain exemplary implementations of the disclosed technology.

The invention claimed is:

1. A system for tokenizing software code security vulnerabilities and remediating matching vulnerabilities in application code, the system comprising:
   one or more processors;
   memory in communication with the one or more processors and storing instructions that, when executed by the one or more processors, cause the system to:
      receive an application code package;
      identify one or more fields of the application code package that correspond to one or more generalized remediation tokens, wherein a differential analysis is stored in association with each of the one or more generalized remediation tokens;
      locate one or more fields of the application code package that include a vulnerability defined by a generalized remediation token of the one or more generalized remediation tokens; and
      automatically apply remediation of the one or more fields of the application code package using the generalized remediation token by applying code changes indicated by the differential analysis stored in association with the generalized remediation token.

2. The system of claim 1, wherein the instructions further cause the one or more processors to cause the system to:
   receive initial vulnerability listings responsive to submissions of one or more initial code packages to one or more software security analysis tools;
   receive subsequent vulnerability listings responsive to actual or potential remediations of the one or more initial code packages by the one or more software security analysis tools; and
   generate differential listings comprising vulnerability remediation updates to the one or more initial code packages by the one or more software security analysis tools.

3. The system of claim 2, wherein each of the vulnerability remediation updates identify one or more of: an associated library, a library method, a line, an initial value, and a subsequent changed value.

4. The system of claim 3, wherein at least one of the fields of the application code package are remediated by replacement using the subsequent changed value of at least one of the vulnerability remediation updates associated with a corresponding generalized remediation token.

5. The system of claim 2, wherein the instructions further cause the one or more processors to apply a weight to each field of the differential listings according to one or more of a type of a vulnerability threat and a severity of the vulnerability threat.

6. The system of claim 2, wherein the generalized remediation tokens are pooled according to remediated and unchanged action associated with the vulnerability remediation updates.

7. The system of claim 2, wherein the one or more software security analysis tools belong to at least one of:
   Static Application Security Testing (SAST);
   Open Source Analysis (OSA);
   Dynamic Application Security Testing (DAST); and
   Interactive Application Security Testing (IAST).

8. The system of claim 1, wherein the instructions further cause the one or more processors to determine and output an overall risk score for the application code package by computing a weighted average of each field of the application code associated with the one or more generalized remediation tokens according to one or more of a vulnerability threat type and a vulnerability threat severity.

9. The system of claim 1, wherein the instructions further cause the one or more processors to:
   output for review by a user, one or more options for remediation of the of the one or more fields of the application code package; and
   responsive to a selection of the one or more options, automatically apply remediation of the one or more fields of the application code package using the generalized remediation token according to a selected option.

10. The system of claim 1, wherein each of the one or more generalized remediation tokens are generated based on differential listings of vulnerabilities identified by one or more software security analysis tools and any remediation updates that have been made to correct the identified vulnerabilities.

11. A method for automated remediation of application code using tokenized software code security vulnerabilities, the method comprising:
   receiving an application code package;
   identifying one or more fields of the application code package having a vulnerability that corresponds to one or more generalized remediation tokens, wherein a differential analysis is stored in association with each of the one or more generalized remediation tokens; and
   automatically applying remediation of the one or more fields of the application code package using a generalized remediation token of the one or more generalized remediation tokens by applying code changes indicated by the differential analysis stored in association with the generalized remediation token.

12. The method of claim 11, further comprising:
   receiving initial vulnerability listings responsive to submissions of one or more initial code packages to one or more software security analysis tools;
   receiving subsequent vulnerability listings responsive to actual or potential remediations of the one or more initial code packages by the one or more software security analysis tools;
   generating one or more differential listings comprising vulnerability remediation updates to the one or more initial code packages by the one or more software security analysis tools; and generating the generalized remediation token for each of the vulnerability remediation updates identified in the differential listings.

13. The method of claim 12, wherein each of the vulnerability remediation updates identify one or more of: an associated library, a library method, a line, and an initial value, and a subsequent changed value.

14. The method of claim 13, wherein at least one of the fields of the application code package are remediated by replacement using the subsequent changed value of a vulnerability remediation update associated with the one or more generalized remediation tokens.

15. The method of claim 12, further comprising applying a weight to each field of the differential listings according to one or more of a type of a vulnerability threat and a severity of the vulnerability threat.

16. The method of claim 12, further comprising:

determining similarities among the generalized remediation tokens;

pooling similar generalized remediation tokens;

storing the pooled similar generalized remediation tokens in a repository; and revising at least one previously generated generalized remediation token based on the determined similarities.

17. The method of claim 12, wherein the one or more generalized remediation tokens are pooled according to remediated and unchanged action associated with the vulnerability remediation updates.

18. The method of claim 11, further comprising:

outputting for review by a user, one or more options for remediation of the of the one or more fields of the application code package; and responsive to a selection of the one or more options, automatically applying remediation of the one or more fields of the application code package using the generalized remediation token according to a selected option.

19. A non-transitory computer readable storage medium storing instructions that are configured to cause one or more processors to:

receive an application code package;

identify one or more fields of the application code package having a vulnerability that corresponds to a generalized remediation token, wherein a differential analysis is stored in association with each of the one or more generalized remediation tokens; and automatically apply remediation of the one or more fields of the application code package using a generalized remediation token of the one or more generalized remediation tokens by applying code changes indicated by the differential analysis stored in association with the generalized remediation token.

20. The non-transitory computer readable storage medium of claim 19, wherein the instructions are further configured to cause the one or more processors to replace at least one field of the application code package with a subsequent changed value based on the generalized remediation token.

* * * * *